United States Patent [19]

DeBeni

[11] Patent Number: 4,467,862

[45] Date of Patent: Aug. 28, 1984

[54] DEVICE FOR PASSIVE HEAT TRANSPORT AND INTEGRATED SOLAR COLLECTOR INCORPORATING SAME

[75] Inventor: Gianfranco DeBeni, Cadrezzate, Italy

[73] Assignee: European Atomic Energy Community (Euratom), Luxembourg, Luxembourg

[21] Appl. No.: 441,113

[22] Filed: Nov. 12, 1982

Related U.S. Application Data

[62] Division of Ser. No. 286,664, Jul. 24, 1981, abandoned.

[30] Foreign Application Priority Data

Aug. 7, 1980 [GB] United Kingdom ............... 8025792

[51] Int. Cl.³ .............................................. F28D 15/00
[52] U.S. Cl. .............................. 165/104.22; 126/433; 165/104.11; 237/60; 417/209
[58] Field of Search ................... 165/104.22; 237/60; 417/209, 208, 207; 126/433

[56] References Cited

U.S. PATENT DOCUMENTS 3,929,305 12/1975 Sabol .......................... 165/104.22 X
4,050,509 9/1977 Bienert et al. ............. 165/104.22 X
4,089,366 5/1978 O'Hanlon .................... 165/104.22 X
4,120,172 10/1978 Pierce ................................ 62/119 X
4,357,932 11/1982 Stacy .......................... 165/104.22 X

FOREIGN PATENT DOCUMENTS 2727176 12/1978 Fed. Rep. of Germany.
1558551 1/1980 United Kingdom ........... 165/104.22

Primary Examiner—Albert W. Davis, Jr.
Attorney, Agent, or Firm—Stevens, Davis, Miller & Mosher

[57] ABSTRACT

A device for passively transporting heat in any direction, particularly downwards, from a heat source to a heat sink, which device comprises a boiler for heating a working fluid, a container for condensing vapor of the heated working fluid, means for transferring the said vapor from the boiler to the condenser, and means for transferring the working fluid from the condenser to the boiler, the said working fluid being compelled from the condenser to the boiler, when the device is in use, by expansion of a compressible medium stored in the condenser, which medium is additionally compressed by the vapor of the working fluid when the device is in use.

In one embodiment the heat source for the boiler or the boiler itself is a solar collector.

7 Claims, 15 Drawing Figures

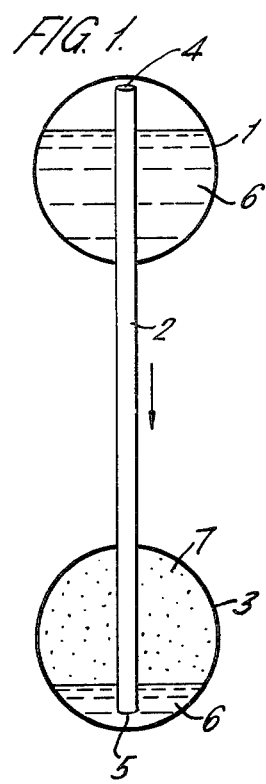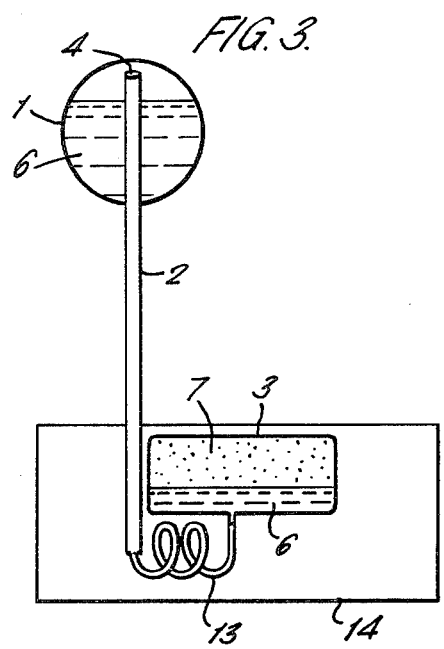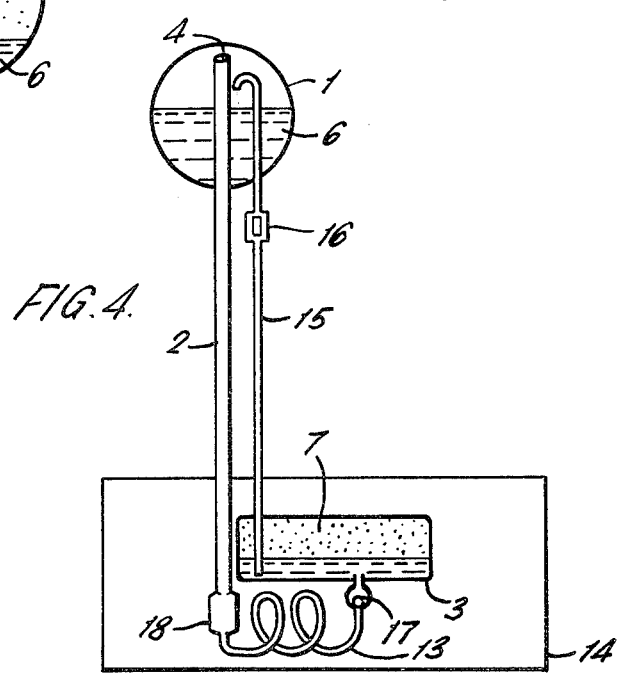

DEVICE FOR PASSIVE HEAT TRANSPORT AND INTEGRATED SOLAR COLLECTOR INCORPORATING SAME

This is a division of application Ser. No. 286,664 filed July 24, 1981, now abandoned.

BACKGROUND OF THE INVENTION

1. Field of the Invention

The present invention relates to a device suitable for transporting heat in any direction and particularly downwards without the use of additional energy other than the heat energy picked up by heat source, e.g. by an integrated solar collector.

2. Prior Art

The Applicants are aware of the following patents: U.K. Nos. 2,003,596, 1,558,551, and 1,541,221, and U.S. Pat. Nos. 4,089,366 and 3,951,204.

SUMMARY OF THE INVENTION

In accordance with the present invention there is provided a device for passively transporting heat from a heat source to a heat sink, which device comprises a boiler for heating a working fluid, a container for condensing the vapour of the heated working fluid, means for transferring the said vapour from the boiler to the condenser, and means for transferring the working fluid from the condenser to the boiler, the said working fluid being compelled from the condenser to the boiler, when the device is in use, by the expansion of a compressible medium stored in the condenser, which medium is additionally compressed by the vapours of the working fluid when the device is in use.

In a preferred embodiment of the present invention either the heat sources for the boiler or the boiler itself is constituted by a solar collector.

BRIEF DESCRIPTION OF THE DRAWINGS

The present invention will now be illustrated, by way of example, with reference to the accompanying drawings, in which:

FIG. 1 shows a device illustrating the principle of the invention, taken in a vertical section, FIG. 3 shows a device of the present invention in its full working mode.

DETAILED DESCRIPTION OF PREFERRED EMBODIMENTS

Figure 2A:
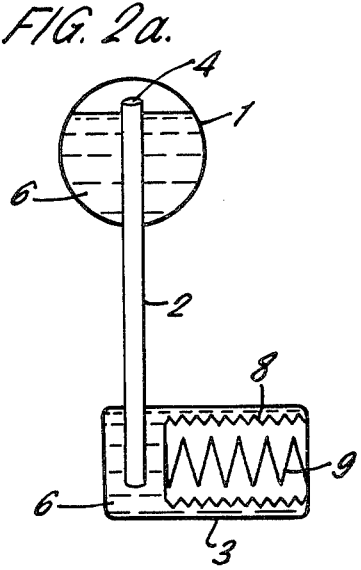
FIGS. 2a–2d show some different devices all using the same principle as the device in FIG. 1.

In its simplest form shown in FIG. 1, the device of the present invention consists of two containers; an upper boiler 1, containing a suitable liquid 6, connected by a tube 2 to a lower condenser 3. The top end 4 of the tube 2 opens into the upper part of the boiler 1, while the bottom end 5 of the tube opens into the lower part of the condenser 3. The boiler 1, which is thermally connected to a heat source as will be described later, contains a liquid 6 having a relatively low boiling point so that the upper part of the boiler will be filled, at a given temperature, with the vapour of the liquid.

The upper part of the condenser 3 is arranged to contain an inert, immiscible, non-condensable gas 7 or a condensable gas whose liquid has a vapour pressure higher than that of the liquid 6.

When the liquid 6 in the boiler 1 is heated sufficiently, its vapour completely fills the upper part of the boiler and then goes downwards through tube 2 into the condenser 3 where it condenses and accumulates. The condenser 3 is thermally connected to a heat user, (not shown for simplicity). The volume of the liquid 6 in the condenser increases and compresses the inert gas 7 in the upper part of the condenser. When the heat source stops heating the boiler, and the boiler cools down, the compressed inert gas 7 forces the liquid 6 in the condenser, upwards through the tube 2, into the boiler, where it stays as long as the boiler is below its previous working temperature.

In one embodiment of the present invention, as will be explained later, the boiler is thermally connected to a solar collector as its heating source so that, during the day the liquid 6 flows downwards, as vapor, and during the night, upwards, in such a way that the system is typically discontinuous.

In FIG. 2 there are shown four embodiments of the present device, all using the principle described above. In the embodiment shown in FIG. 2a, the condenser 3 is provided with bellow units 8 containing a spring 9 and an amount of the same liquid more than sufficient to fill the empty space of the bellows with its vapour. When the boiler is cooled, the tension of the spring, at its maximum compression, forces the liquid 6 stored in the condenser, upwards through the tube 2 and into the boiler.

Figure 2B:
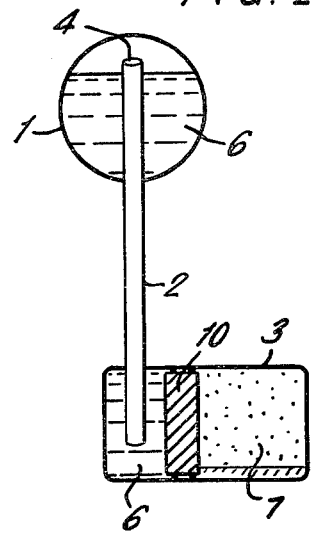
Figure 2C:
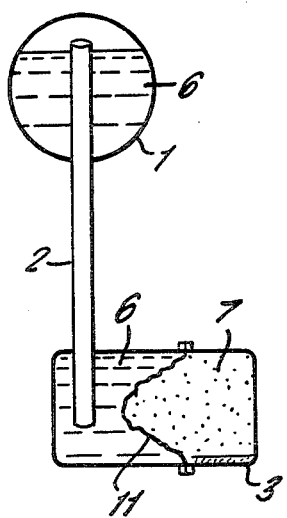
Figure 2D:
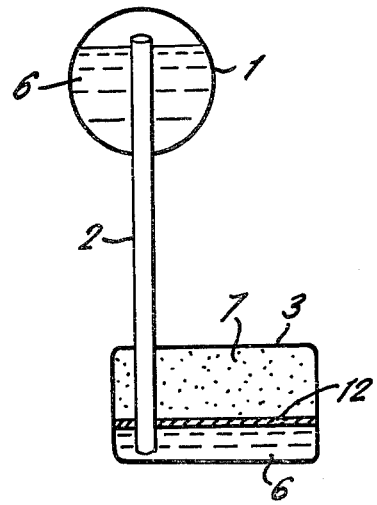

In FIG. 2b, it is the condensible or inert gas 7, together with the vapour coming from some working liquid placed behind the piston 10 that acts on the piston in order to force the liquid 6 back into the boiler 1. In FIG. 2c, the gas is contained together with the vapour of some working liquid in a closed volume which is sealed by a membrane 11 or also a bellows permitting the variation of the volume itself. In the condenser of FIG. 2d when a condensible gas 7 is used, it generates an immiscible, liquid-layer 12 which overlies the liquid 6, since the liquid condensed from the gas 7 is arranged to have a density less than that of liquid 6.

In the described examples, the use of a condensible gas allows a reduction of the condenser volume compared with the use of non-condensible gas. When condensed, its liquid has, at the temperature of the condenser, at least a vapour pressure equal to the difference of the vapour pressure of the working liquid 6 at the boiler and condenser temperatures.

The principle operating in the described devices is the fact that the liquid 6 boils in the boiler 1 at a temperature high enough to overcome by virtue of its vapour pressure the force generated by the energy accumulator present in the condenser 3 (i.e. spring, piston, etc. plus the vapour of the working liquid at the temperature of the condenser), and it is just this force which, when the boiler cools down, acts on and pushes the liquid 6 back into the boiler 1.

In the embodiments shown, when transferring the heat downwards, the vapour flows down, condenses in the lower heat exchanger and accumulates as liquid in the condenser, thus compressing the gas or the other medium contained therein. In the case of the embodiment containing a non-condensible gas, if the volume of the condenser is made a few times (e.g. 2 to 5 times) larger than the volume of the liquid expected to be displaced, the partial pressure of the gas will increase only slightly, thus only requiring a slight increase in the boiling temperature of the liquid for same condenser temperature. When the heat supply to the boiler ceases, the boiler cools down and the pressure existing in the condenser makes the liquid rise back to the boiler, making the system ready for a new cycle.

A peculiar property of the present device, is that it starts to work automatically, transferring heat from top to bottom, as soon as the temperature of the boiler is a few degrees higher than the temperature of the condenser; hence when applied to solar heat collectors, the collector itself is at the lowest possible working temperature with a beneficial effect on the heat collection efficiency of the system. Being a system based on the transport of vapours, and having a negligible pressure drop inside the connecting tube, the present device is practically isothermal from the boiler to the first part of the condensor; any temperature differences between the boiler and the condenser being available in the condenser itself to promote heat transfer from the condenser to the heat storage medium.

In order for the device to operate, the partial pressure of the gas in the free volume of the empty condenser must be at least equal to the hydrostatic pressure produced by the column of liquid in the tube connecting the boiler to the condenser. The system is defined once the difference between the boiler and condenser levels is fixed.

From the specific gravity of the liquid chosen, the minimum partial pressure of the inert gas in the empty condenser is determined, and this pressure plus the vapour pressure of the working liquid at the temperature of the condenser then determines the lowest temperature at which the boiler begins to work. During the condensation process, the temperature of the environment surrounding the condenser may increase slightly, and the partial pressure of the inert gas, now compressed into a smaller volume, also increases. Depending upon the desired maximum temperature around the condenser, and the ratio between the empty condenser volume and the volume remaining for the inert gas when all the working liquid is in the condenser, it is possible to compute the maximum temperature of the boiler towards the end of the evaporation process.

If, as could be the case for solar energy applications, the difference of levels between the boiler and the condenser is, for example, 10 m, and the maximum desired condenser temperature is 30° C., the working liquid should have few bars vapour pressure at room temperature in order to increase by only a few degrees the boiler temperature from the beginning to the end of the evaporation process.

A liquid fulfilling these requirements is e.g. ammonia. For a difference of levels of 10 m, the partial pressure of the inert gas will be about 1 bar. If the volume of the condenser is twice the volume of the boiler, the final partial pressure of the inert gas will be about 2 bars, and for a condenser temperature of 30° C., the boiler at the end will be at 37° C.

Other fluids with relatively lower vapour pressures at room temperature can be used when the desired temperature is higher, or when the difference in levels between the boiler and condenser is only a few meters.

Other examples of suitable fluids, without being restrictive to these, are: sulphur dioxide, ethylene oxide, ethylamine, pentane, acetone, methanol, ethanol, water, etc.

An important property which the working liquid 6 should have is a high heat of evaporation, in order to avoid too large a volume for the boiler and particularly for the condenser. These volumes can be reduced if the cycles are made shorter. In the case of solar energy applications, an artificial, intermittent cooling of the collectors can be obtained by putting a body or shield in front of a row of collectors at a suitable distance therefrom. The shadow of this shield sweeping over the collectors during the day, creates as many cooling down periods as desired.

A similar device was disclosed by O'Hanlon in the U.S. Pat. No. 4,089,366 (1976). That device was also constituted by a boiler in the upper position, a condenser in the lower position and a tube connecting the boiler to the condenser; the working fluid was said to be sulphur dioxide. In that device the recharge of the condensed liquid up to the boiler is obtained by the vapour pressure of the liquid contained in the condenser/reservoir. In order to achieve this result the boiler has to cool down to a temperature much lower than the condenser, such that the difference between the vapour pressure of sulphur dioxide in the condenser and in the cool boiler is at least equal to the hydrostatic pressure created by the column of liquid sulphur dioxide between boiler and condenser.

In the device here described the presence of a pressurizing medium, besides the vapour pressure of the condensed fluid, is useful for assuring the refilling of the boiler, and it would be particularly useful in summer, when the decrease of temperature at night might be insufficient to create the necessary pressure unbalance to recharge the boiler, and the increased working temperature of the boiler (due to the presence of the pressurizing medium) can be easily tolerated during the day.

In FIG. 3, another embodient of the device of the present invention is shown wherein the bottom extremity of the tube 2 is formed into a coil 13 for better condensation of the vapour before it enters the condenser; the coil and condenser being placed within a heat storage unit 14.

The devices hereinbefore described are typically discontinuous, with the advantageous feature of having no mechanical moving parts.

In FIG. 4 an embodiment of the present device is shown which may be termed "semi-continuous".

The starting point is a device as per that already described. This device now contains a second tube 15, of small diameter, connecting the condenser 3, at its lowest point, to the upper part of the boiler, and having a particular one-way shut-off valve 16, preferentially located near or inside the boiler itself. This valve allows the flow of liquid only from the condenser 3 to the boiler 1. This valve requires a positive pressure difference before opening, but it is arranged to remain open until the pressure is nearly the same on both sides of the valve. Only after this condition has been reached will it close again. Valves of this kind are already in current use. A further simple one-way valve 17 is placed at the end of tube 2 conveying the vapours from the boiler to the reservoir, thus allowing the flow of liquid only from the boiler to the reservoir.

A further small modification is a certain enlargement 18 of the tube 2, just before the cooling coil 13 of the condenser.

In the embodiment of FIG. 4, a version with the inert gas in direct contact with the working liquid is shown. All the other means of energy accumulation as described for the discontinuous device can also be considered.

Referring to FIG. 4, let us suppose that the liquid 6 is in the boiler and is boiling. If some inert gas 7 reaches the boiler, it is transported together with the vapours through the condenser and finally into the empty space of the reservoir itself. During the evaporation/condensation process, all the circuit has the same pressure, corresponding to the vapour pressure of the fluid at the temperature of the boiler, the one-way valve 17 is normally open and the other valve 16 is closed. When nearly all the liquid 6 has boiled out of the boiler, the rate of evaporation becomes smaller than the rate of condensation and the pressure in the boiler decreases. At this point, the one-way valve 17 closes, and the first part of the condenser (the enlarged portion 18 of the tube 2) behaves as a cold trap for condensing the residual vapours coming from the boiler. When the boiler is dried out, the pressure in the boiler is reduced to the vapour pressure of the liquid at the temperature of the condenser. Just before reaching this condition, the pressure difference between the condenser (still at the pressure reached during the period of normal evaporation) and the boiler, now much lower, is sufficient to open the shut-off valve 16. The pressure of the inert gas in the condenser then pushes the liquid back from the condenser to the boiler, and the system can continue its work of transporting another quantity of heat downwards.

The system is able to recharge the liquid from the condenser to the boiler as soon as the pressure in the boiler decreases; be it due to a lack of liquid or to a lack of heat supply.

If specifically designed, the system could also be made to operate in a pulsating mode. Depending on the temperature reached by the boiler during the final moments of its drying out, it can happen that the first drops of liquid reaching the hot boiler cause a rapid increase of pressure of the boiler, sufficient to close the shut-off valve 16 before the bulk of the liquid has reached the boiler.

Figure 4A:
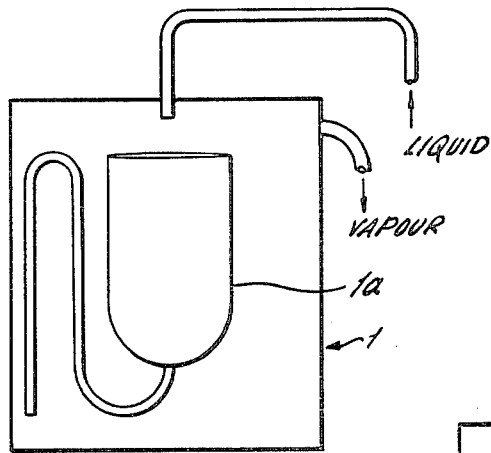
FIG. 4 shows a further embodiment of the device of FIG. 3; with FIGS. 4a, 4b and 4c showing different examples of boiler construction.
Figure 4B:
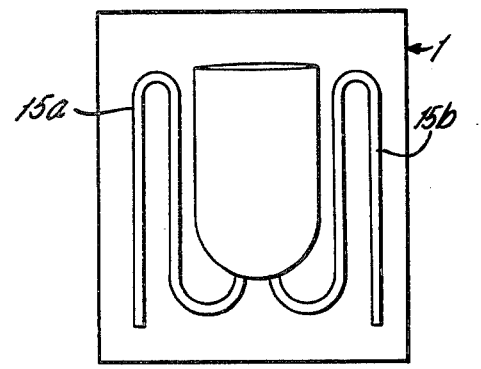
Figure 4C:
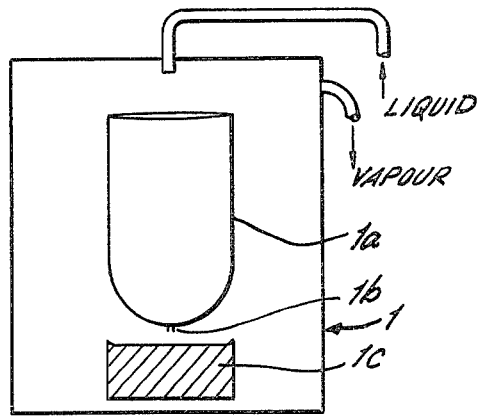

The mode of functioning of the valve 16, with a hysteresis as large as desired between opening and closing, is such that it will assure a sufficient recharging of the liquid in the boiler. This hysteresis which causes a higher $\Delta T$ between boiler and condenser, can be reduced and eventually brought to zero if a suitable device, assuring a two-step charging of the liquid in the boiler is utilized at the same time. The goal to be reached is the avoiding of an immediate contact between the recharged liquid and the hot walls of the boiler. This can be obtained, for example as shown in FIGS. 4a, 4b and 4c, by feeding the liquid into a small container or tray 1a inside the boiler having a very small heat capacity and having a bad thermal connection with the boiler walls.

The apparatus assuring a two-step charging can also be a siphon, or simply a container with a small leak or hole 1b therein and a piece of absorbing material 1c under it, that will allow the liquid to reach the evaporation surface only after it is flooded. This latter version is more suitable for applications when the heat supply to the boiler can be discontinuous: in fact it can happen that the cooling down of the boiler causes the recharge of the liquid from the condenser, but that the amount of that liquid is not sufficient for triggering the discharge of the siphon. The same result can however be reached by adopting a siphon having two discharging tubes see FIG. 4b, one 15a relatively large and empty, for a rapid discharge in the usal siphon mode, and the other tube 15b filled with a capillary structure and able to trigger the discharge also when the container of the siphon is not full of liquid.

A similar device is already disclosed in the British Pat. No. 1,558,551 (deposited first as Belgian Pat. No. 851734) and in the successive Brevet de Perfectionnement, Belgium, No. 867468. That device was mainly intended for weightless applications, but it can work also against gravity, and it was conceived for keeping constant the temperature of some components (and so also the temperature of the boiler) regardless from the temperature of the condenser. In that device there are the boiler, the condenser, the reservoir and the two non-return valves. The pressure for assuring the passage of the liquid from the reservoir to the boiler is provided by a pressurizing gas confined behind a bellows, and held at a pressure as constant as possible.

In the device of the present invention, when a bellows is used, together with the pressurizing gas there is always a sufficient amount of the working liquid, because it is an essential feature of this device that the actual working pressure is not held constant but it is the sum of the partial pressure of the gas and the vapour pressure of the working liquid at the temperature of the condenser.

The presence of some working liquid together with the pressurizing gas is the cause of a quite different behaviour between the two devices, making the one, the object of the present invention, much more suitable for solar heat applications.

In fact when there is only the pressurizing gas behind the bellows, the pressure difference available for recharging the liquid into the boiler is given by the difference between the constant pressur of the gas and the vapour pressure of the working liquid at the temperature of the condenser. When this temperature increases, as it is required in solar heat application, the lifting capacity is more and more reduced and can become insufficient for refilling the boiler. To assure this recharging the constant gas pressure must be set at a high value; obliging the boiler to be always at a high temperature with a reduced efficiency when it is coupled to a solar heat collector.

On the other hand, when the pressurizing gas is combined with some working liquid, the pressure difference available for recharging the boiler is always equal to the partial pressure of the gas, (keeping the reservoir at the same temperature as the condenser), and this will be set just to the minimum value corresponding to the hydrostatic head. The result is that the device is always capable of recharging the boiler, regardless of the condenser temperature, and equally importantly, the temperature of the boiler will be lower when the condenser temperature is also low.

Figure 5A:
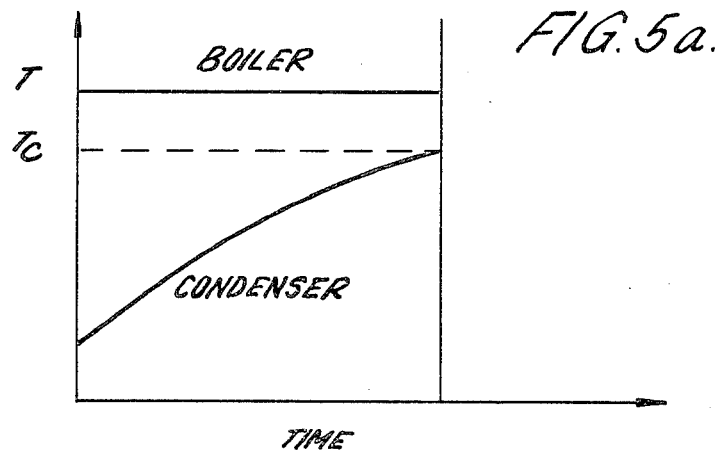
FIGS. 5a and 5b are sketch graphs illustrating the behaviour of a described device under different operating conditions.
Figure 5B:
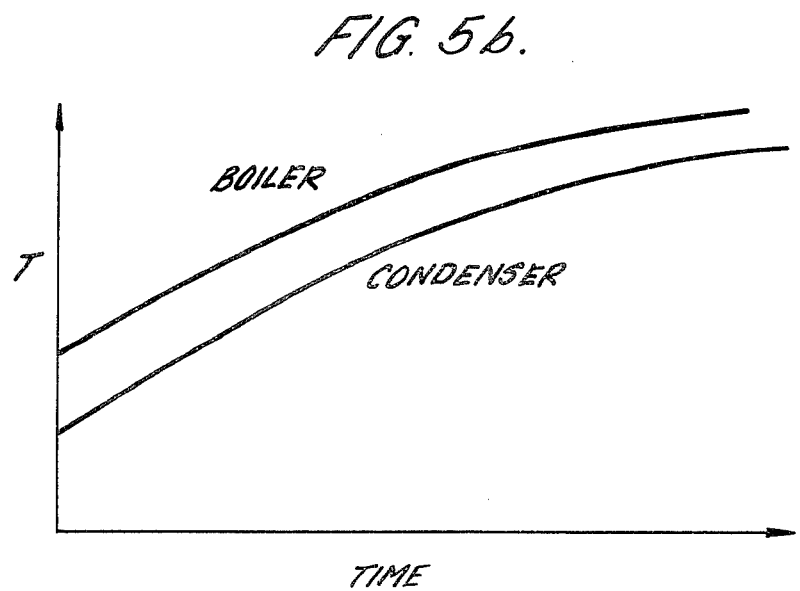

Two sketch graphs illustrating the different behaviours of the two systems when a given amount of substance is heated are shown in FIGS. 5a and 5b. In FIG. 5a the condenser and the boiler are used without a working liquid with the pressuring gas, whilst in FIG. 5b they are used with a working liquid with the pressuring gas.

It will be seen that whereas in the former case the boiler temperature is always high and a limiting temperature Tc is reached for the condenser temperature beyond which the system will not operate, no such boiler condition or condenser limit occurs with the later case.

Figure 6A:
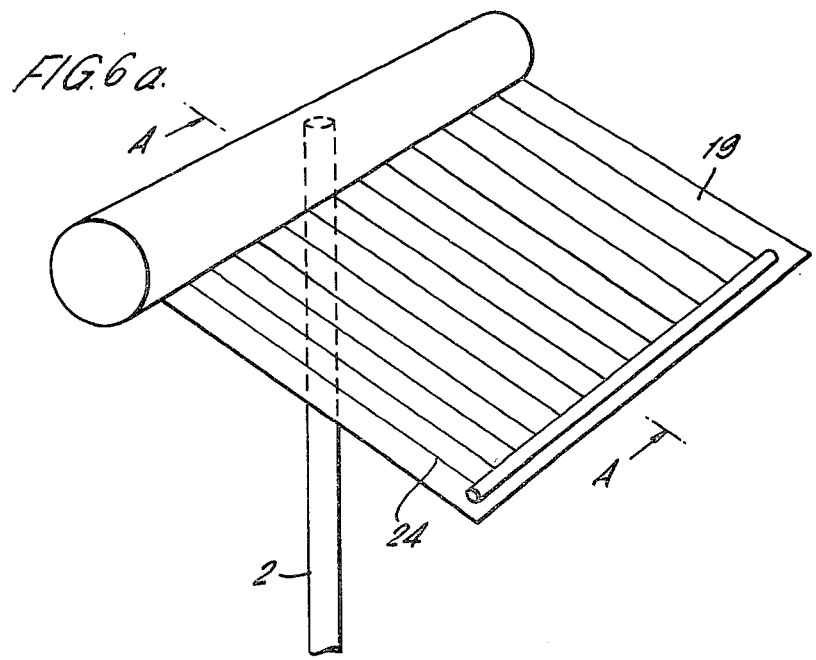
FIG. 6a shows an integrated solar collector incorporating a device of the present invention.
Figure 6B:
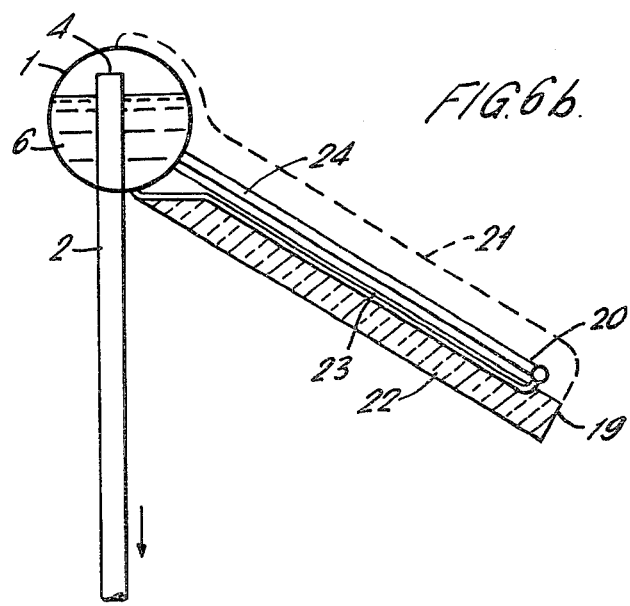
FIG. 6b is a sectional vertical view of the collector of FIG. 6a, and FIG. 7 shows for further embodiment of the solar collector of FIGS. 6a and 6b.

FIG. 6a and 6b schematically show an example of the application of the device of the present invention to a conventional solar collector 19.

The solar collector comprises a dark surface 20, protected by a transparent cover 21 and backed by a thermal insulation 22. The surface 20 contains tubes 24 through which the working fluid flows, and in this case, the fluid is the same working fluid 6 used in the devices for the downwards transport of heat.

Here the liquid boils during its passage through the tubes of the solar collector, additionally enhancing its circulation, and the vapour and the liquid reach the upper part of the collector where they then enter the boiler for separation of the vapour and the liquid to occur. The vapour, as in the previously described devices, flows downwards to the condenser (not shown), and the liquid returns to the solar collector via tubes 23 in the collector for a further partial evaporation.

Figure 7:
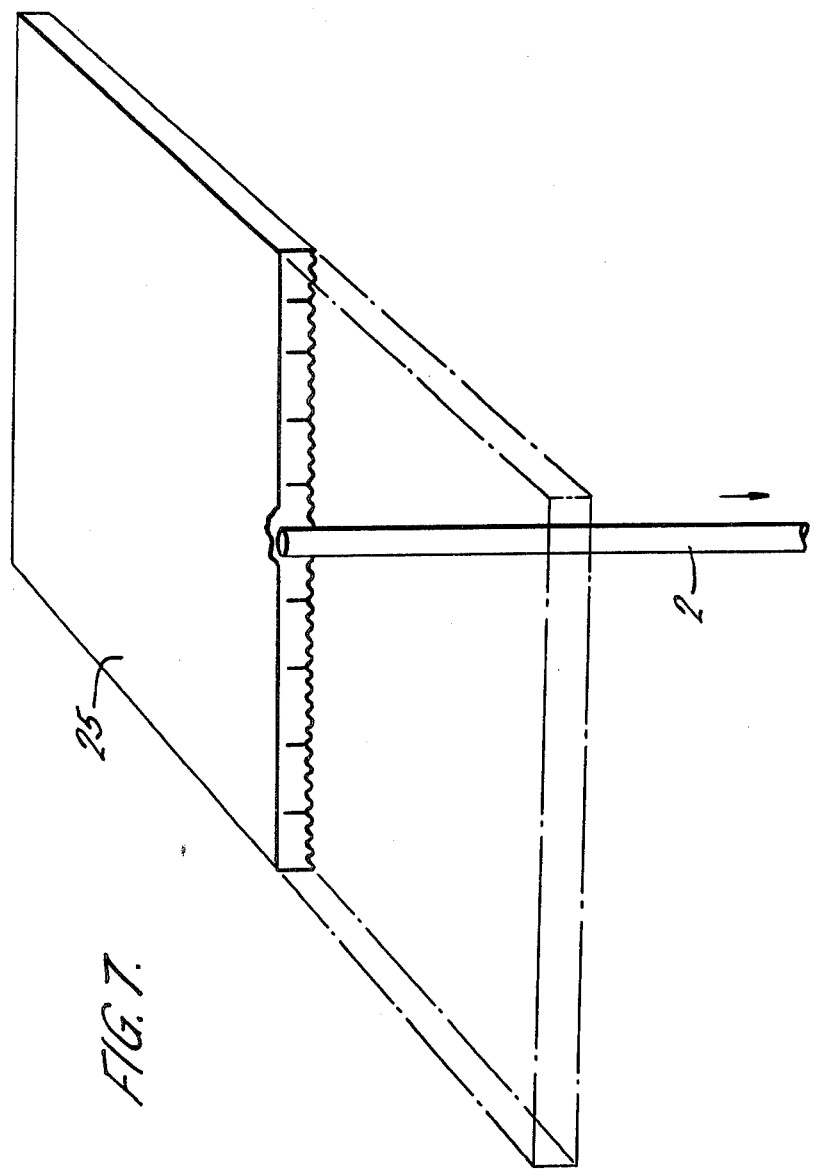

In the embodiment shown in FIG. 7, the solar collector 25 itself constitutes the boiler and vapour/liquid separator. In this case, the collector is in the form of a flat container, horizontally disposed and having towards its centre, the tube 2 for conveying the vapours produced in the boiler/collector to the condenser.

While the present invention has been illustrated and described with reference to specific embodiments thereof, it is to be understood that numerous changes and modifications may be made therein without departing from the scope of the invention as defined in the appended claims.

For example, for rendering the device more flexible, the boiler or the condenser or both may be arranged to have a variable volume.

I claim:

1. A device for passively transporting heat in any direction, particularly downwards, from a heat source to a heat sink, which device comprises a boiler having walls for heating a working fluid, a container for condensing vapour of the heated working fluid, means for transferring the said vapour from the boiler to the condenser, means for transferring the working fluid from the condenser to the boiler, the said working fluid being compelled from the condenser to the boiler, when the device is in use, by expansion of a compressible medium stored in the condensor, which medium is additionally compressed by the vapour of the working fluid when the device is used, said transfer means for the vapour and for the working fluid being provided with self-actuated one-way control valves and means in said boiler to prevent immediate contact between the working fluid entering the boiler and said walls of the boiler.

2. The device as claimed in claim 1 wherein the means for transferring the vapour from the boiler to the condenser, and the means for transferring the working fluid from the condenser to the boiler, are tubes.

3. A device as claimed in claim 2 wherein the tube for transferring vapour from the boiler to the condenser has a portion of the tube in the form of a cooling coil.

4. A device as claimed in claim 2 wherein the tube for transferring vapour from the boiler to the condenser contains an enlarged portion.

5. A device as claimed in claim 2 wherein the tube for transferring vapour from the boiler to the condenser contains an enlarged portion and a portion in the form of a cooling coil associated therewith.

6. A device as claimed in claim 1 wherein the compressible medium in the condenser contains a gas compatible with the working liquid.

7. A device as claimed in claim 6 wherein the said gas is a mixture of condensable and non-condensable gas.

* * * * *